United States Patent
Ertas et al.

(10) Patent No.: US 12,378,898 B2
(45) Date of Patent: Aug. 5, 2025

(54) WINDAGE COVER THAT COVERS FASTENERS COUPLING A RING GEAR ASSEMBLY TO AN OUTPUT SHAFT

(71) Applicant: General Electric Company, Cincinnati, OH (US)

(72) Inventors: Bugra H. Ertas, Niskayuna, NY (US); Norman A. Turnquist, Sloansville, NY (US); Ravindra Shankar Ganiger, Bengaluru (IN); Gontla Nagashiresha, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/792,111

(22) Filed: Aug. 1, 2024

(65) Prior Publication Data

US 2024/0392697 A1     Nov. 28, 2024

Related U.S. Application Data

(62) Division of application No. 17/655,451, filed on Mar. 18, 2022, now Pat. No. 12,055,059.

(30) Foreign Application Priority Data

Dec. 10, 2021 (IN) .............................. 202111057466

(51) Int. Cl.
| | | |
|---|---|---|
| *F02C 7/36* | (2006.01) | |
| *F01D 25/24* | (2006.01) | |
| *F01D 25/28* | (2006.01) | |

(52) U.S. Cl.
CPC ........... *F01D 25/243* (2013.01); *F01D 25/28* (2013.01); *F02C 7/36* (2013.01); *F05D 2240/14* (2013.01);
(Continued)

(58) Field of Classification Search
CPC .......... F02C 7/36; F01D 25/243; F01D 25/24; F16H 57/08; F16H 57/082; F16H 57/025; F05D 2260/40; F05D 2260/40311
See application file for complete search history.

(56) References Cited

U.S. PATENT DOCUMENTS 9,121,491 B2   9/2015   Hancox
10,066,734 B2 *   9/2018   Sheridan ............. F16H 57/0486
(Continued)

FOREIGN PATENT DOCUMENTS

EP    1114949 B1    7/2004
EP    3825532 A1    5/2021
(Continued)

*Primary Examiner* — David E Sosnowski
*Assistant Examiner* — Maxime M Adjagbe
(74) *Attorney, Agent, or Firm* — Venable LLP; Michele V. Frank

(57) ABSTRACT

A windage cover for a plurality of fasteners coupling a ring gear assembly to an output shaft. The windage cover includes a clip retention member abutting an integral cover shell of the output shaft, and a foot portion configured to be inserted into a pilot groove between an integral lip and an arm portion of the output shaft. The windage cover also includes a wall portion connected to the foot portion, the wall portion being retained at one end of the wall portion by the clip retention member. The windage cover is configured to cover the plurality of fasteners.

20 Claims, 6 Drawing Sheets

(52) U.S. Cl.
CPC ...... *F05D 2250/13* (2013.01); *F05D 2250/75* (2013.01); *F05D 2260/31* (2013.01); *F05D 2260/38* (2013.01); *F05D 2260/40311* (2013.01)

(56) References Cited

U.S. PATENT DOCUMENTS

| | | |
|---|---|---|
| 10,352,245 B2 | 7/2019 | Mueller et al. |
| 10,605,351 B2 | 3/2020 | Sheridan et al. |
| 10,890,245 B2 | 1/2021 | McCune et al. |
| 10,890,247 B2 | 1/2021 | Gravina |
| 2012/0237336 A1 | 9/2012 | McCune et al. |
| 2019/0360578 A1 | 11/2019 | Chevillot et al. |
| 2020/0003078 A1 | 1/2020 | Wuestenberg |
| 2020/0032716 A1 | 1/2020 | Di Giovanni et al. |
| 2020/0056484 A1 | 2/2020 | Breen |
| 2020/0109631 A1 | 4/2020 | Breen |

FOREIGN PATENT DOCUMENTS

| | | |
|---|---|---|
| FR | 3127024 A1 | 3/2023 |
| FR | 3127025 A1 | 3/2023 |
| FR | 3129436 A1 | 5/2023 |
| FR | 3129690 A1 | 6/2023 |
| JP | 2006292023 A | 10/2006 |

* cited by examiner

WINDAGE COVER THAT COVERS FASTENERS COUPLING A RING GEAR ASSEMBLY TO AN OUTPUT SHAFT

CROSS REFERENCE TO RELATED APPLICATIONS

This application is a divisional of U.S. patent application Ser. No. 17/655,451 filed on Mar. 18, 2022, which claims the benefit of Indian patent application No. 202111057466, filed on Dec. 10, 2021, the entire contents of which are hereby incorporated by reference in their entireties.

TECHNICAL FIELD

The present disclosure relates generally to ring gear assembly couplings and, in particular, to a windage cover for covering fasteners coupling a ring gear assembly to an output shaft.

BACKGROUND

A gas turbine engine generally includes a fan and a core arranged in flow communication with one another with the core disposed downstream of the fan in the direction of flow through the gas turbine engine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such a portion of the air is progressively compressed by the LP compressor and then by the HP compressor until the compressed air reaches the combustion section. Fuel is mixed with the compressed air and burned within the combustion section to produce combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

The LP turbine drives the LP shaft, which drives the LP compressor. In addition to driving the LP compressor, the LP shaft can drive the fan through a power gearbox, which allows the fan to be rotated at fewer revolutions per unit of time than the rotational speed of the LP shaft for greater efficiency. The power gearbox typically includes a sun gear, one or more planet gears, and a ring gear. Lubrication fluid is provided to one or more of these gears and associated bearings during operation to cool down the gearbox, to increase its efficiency and to reduce wear. The lubrication fluid is typically collected within an inner casing of the gearbox and centrifuged out through openings defined between a flange assembly, e.g., a triple or a quadruple flange assembly (i.e., a bolted joint) axially aligned with the ring gear of the gearbox and positioned radially outward of the ring gear of the gearbox.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
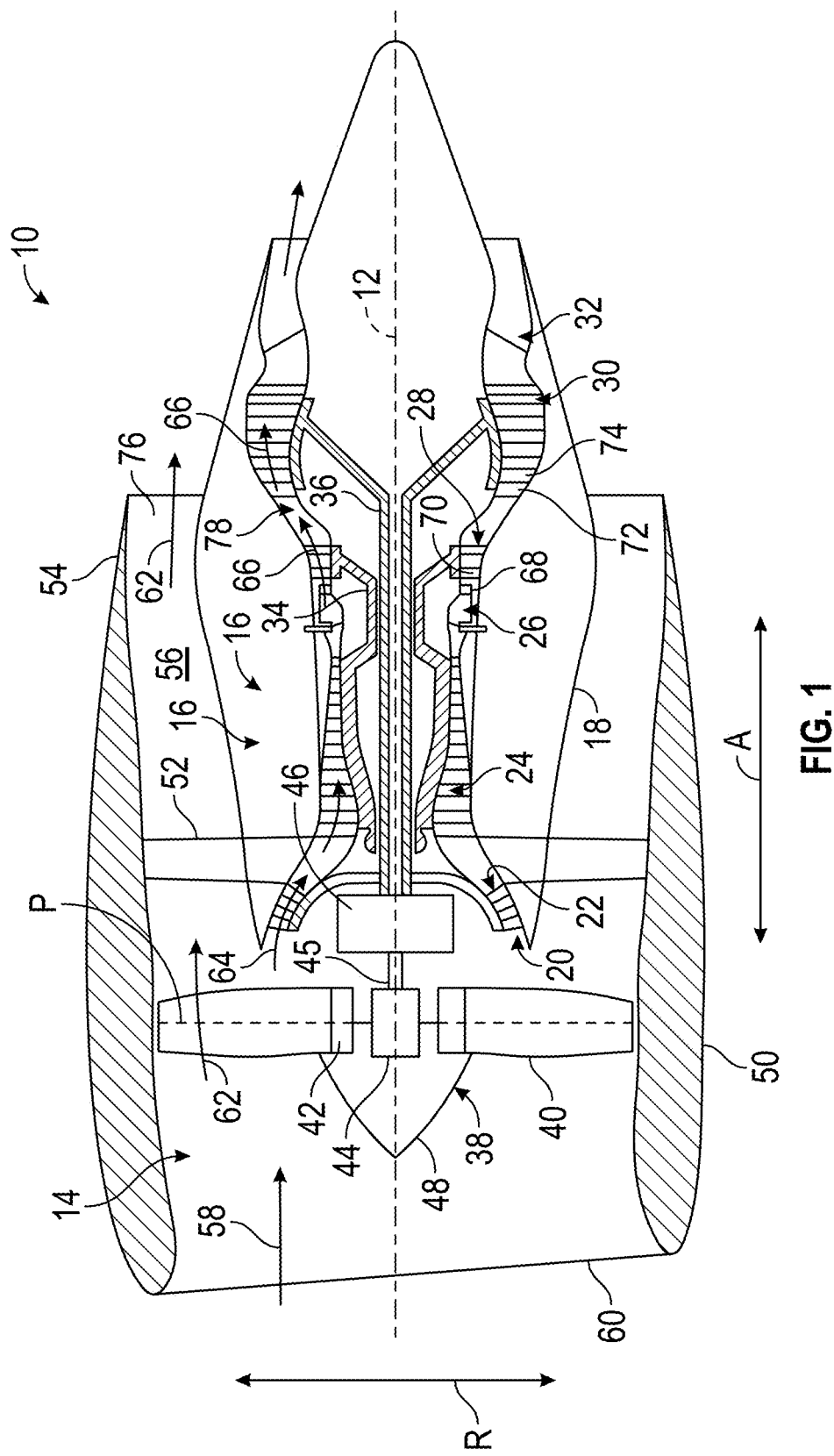
FIG. 1 is a schematic cross-sectional diagram of a turbine engine, according to an embodiment of the present disclosure.

Additional features, advantages, and embodiments of the present disclosure are set forth or apparent from consideration of the following detailed description, drawings, and claims. Moreover, it is to be understood that both the foregoing summary of the present disclosure and the following detailed description are exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the spirit and scope of the present disclosure.

In the following specification and the claims, reference may be made to a number of "optional" or "optionally" elements meaning that the subsequently described event or circumstance may or may not occur, and that the description includes instances in which the event occurs and instances in which the event does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine or the combustor. Moreover, the terms "radial" and "radially" refer to directions and orientations that extend substantially perpendicular to the centerline of the turbine engine or the fuel-air mixer assembly. In addition, as used herein, the terms "circumferential" and "circumferentially" refer to directions and orientations that extend arcuately about the centerline of the turbine engine or the fuel-air mixer assembly.

Embodiments of the present disclosure seek to provide a windage cover for application in a ring gear assembly. The windage cover is a boltless shield that is incorporated at a ring gear bolted flange (the highest speed bolted flange). With the implementation of the windage cover shear losses associated with an interrupted bolted flange geometry can be eliminated. The mechanical configuration includes a ring gear with a shrouded-flange that can act as a radial shield, and functions to retain the axial stack of the shield cover. The windage cover is an "L" shaped ring that is coupled to the ring gear outer diameter (OD) through a pilot groove. This acts as the radial retention mechanism, which is configured such that increasing speed (centrifugal force) results in increased radial contact stress between rotating parts. Furthermore, the axial locating feature is between the windage cover inner diameter (ID) shoulder and the ring gear face. In addition, an axial retention clip is implemented to secure the assembly. A second embodiment uses a windage cover with a spring-like feature that is contoured to the bolted flange fastener locations to provide axial preload in the system without having to design accurate tolerances.

FIG. 1 is a schematic cross-sectional diagram of a turbine engine 10, according to an embodiment of the present disclosure. The turbine engine 10 can include, for example, a turbojet engine, a turboprop engine, a turbofan, or a turboshaft engine. As shown in FIG. 1, the turbine engine 10 defines an axial direction A (extending parallel to a longitudinal centerline 12 provided for reference) and a radial direction R that is normal to the axial direction A. In general, the turbine engine 10 includes a fan section 14 and a core turbine engine 16 disposed downstream from the fan section 14.

The core turbine engine 16 depicted generally includes an outer casing 18 that is substantially tubular and defines an annular inlet 20. As schematically shown in FIG. 1, the outer casing 18 encases, in serial flow relationship, a compressor section including a booster or low pressure (LP) compressor 22 followed downstream by a high pressure (HP) compressor 24, a combustion section 26, a turbine section including a high pressure (HP) turbine 28 followed downstream by a low pressure (LP) turbine 30, and a jet exhaust nozzle section 32. A high pressure (HP) shaft or spool 34 drivingly connects the HP turbine 28 to the HP compressor 24 to rotate the HP turbine 28 and the HP compressor in unison. A low pressure (LP) shaft 36 drivingly connects the LP turbine 30 to the LP compressor 22 to rotate the LP turbine 30 and the LP compressor 22 in unison. The compressor section, the combustion section 26, the turbine section, and the jet exhaust nozzle section 32 together define a core air flowpath.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuation member 44 configured to collectively vary the pitch of the fan blades 40 in unison. The fan blades 40, disk 42, and actuation member 44 are together rotatable about the longitudinal centerline 12 via a fan shaft 45 that is powered by the LP shaft 36 across a power gearbox 46. The power gearbox 46 includes a plurality of gears for adjusting the rotational speed of the fan shaft 45 and, thus, the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. In addition, the fan section 14 includes an annular fan casing or a nacelle 50 that circumferentially surrounds the fan 38 and/or at least a portion of the core turbine engine 16. It should be appreciated that the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 to define a bypass airflow passage 56 therebetween.

During operation of the turbine engine 10, a volume of air 58 enters the turbine engine 10 through an inlet 60 of the nacelle 50 and/or fan section 14. As the volume of air 58 passes across the fan blades 40, a first portion of the air 58 as indicated by arrow 62 is directed or routed into the bypass airflow passage 56, and a second portion of the air 58 as indicated by arrow 64 is directed or routed into the upstream section of the core air flowpath, or, more specifically, into the annular inlet 20 of the LP compressor 22. The ratio between the first portion of air 62 and the second portion of air 64 is commonly known as a bypass ratio. The pressure of the second portion of air 64 is then increased as it is routed through the HP compressor 24 and into the combustion section 26, where the highly pressurized air is mixed with fuel and burned to provide combustion gases 66.

The combustion gases 66 are routed into the HP turbine 28 and expanded through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed into and the LP turbine 30 and expanded through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus, causing the LP shaft 36 to rotate, thereby supporting operation of the LP compressor 22 and rotation of the fan 38 via the power gearbox 46.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the turbine engine 10 depicted in FIG. 1 is by way of example only, and that, in other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, it also should be appreciated that, in other exemplary embodiments, any other suitable number or configuration of compressors, turbines, shafts, or a combination thereof may be provided. It also should be appreciated, that in still other exemplary embodiments, aspects of the present disclosure may be incorporated into any other suitable gas turbine engine.

Figure 2:
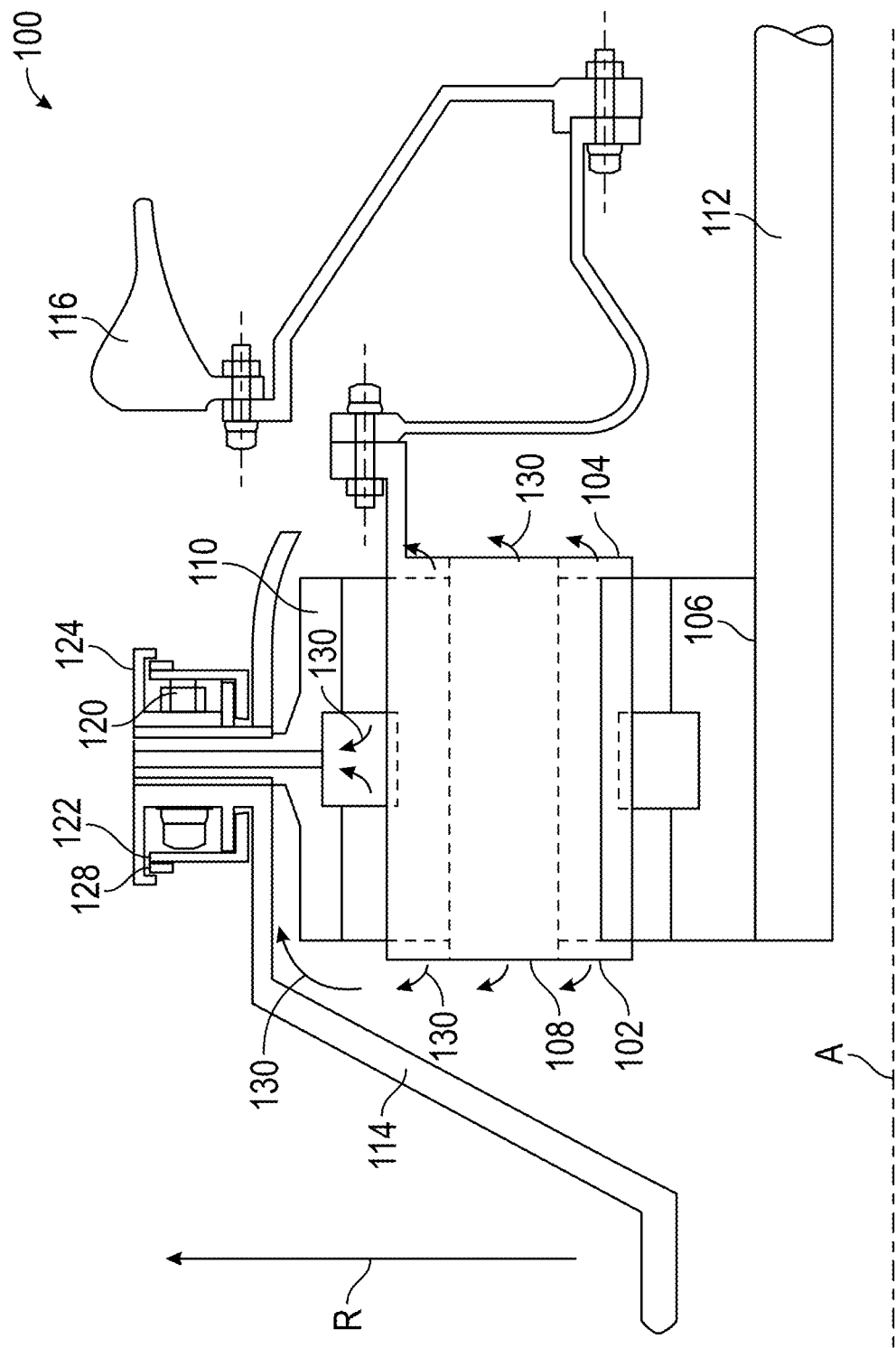
FIG. 2 is a schematic diagram of an epicyclic gearbox assembly, according an embodiment of the present disclosure.

FIG. 2 is a schematic diagram of an epicyclic gearbox assembly 100, according to an embodiment of the present disclosure. The epicyclic gearbox assembly 100 generally defines an axial direction A (i.e., centerline), and a radial direction R. The epicyclic gearbox 100 has a forward side 102 and an aft side 104. In at least certain exemplary embodiments, the power gearbox 46 described above with reference to FIG. 1 may be configured in substantially the same manner as the epicyclic gearbox assembly 100 depicted in FIG. 2.

Accordingly, in such an exemplary embodiment, the axial direction A and radial direction R of the turbine engine 10 shown in FIG. 1 may correspond to the axial direction A and radial direction R of the epicyclic gearbox assembly 100. The epicyclic gearbox assembly 100 generally includes a sun gear assembly 106, a planet gear assembly 108, and a ring gear assembly 110.

Figure 3:
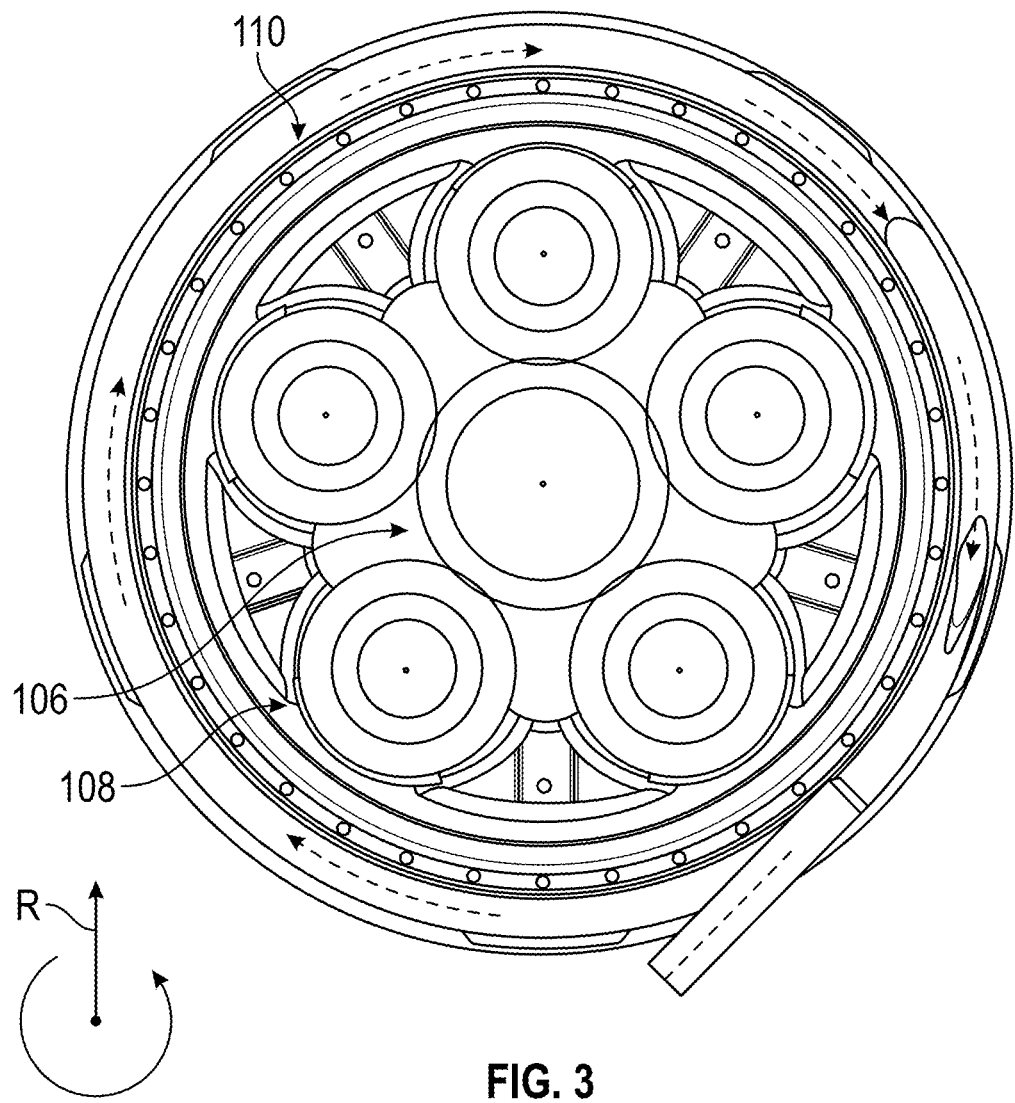
FIG. 3 is a schematic diagram of a sun gear assembly, a planet gear assembly, and a ring gear assembly in the epicyclic gearbox assembly, according to an embodiment of the present disclosure.

FIG. 3 is a schematic diagram of the sun gear assembly 106, the planet gear assembly 108, and the ring gear assembly 110 in the epicyclic gearbox assembly 100, according to an embodiment of the present disclosure. The planet gear assembly 108 is provided between the sun gear assembly 106 and the ring gear assembly 110. The sun gear assembly 106 engages the planet gear assembly 108, which, in turn, engages the ring gear assembly 110. The planet gear assembly 108 engages both the sun gear assembly 106 and the ring gear assembly 110. The term "engaged," as used herein with respect to two or more gear assemblies gears, refers to, e.g., one or more teeth of such gear assemblies engaging with one another such that the two gears rotate with each other. Accordingly, although one or more gears may be represented schematically in the Figures as smooth circles for clarity, it will be appreciated that such gears actually include a plurality of teeth arranged along their circumference for engaging with an adjacent gear(s).

Referring back to FIG. 2, the sun gear assembly 106 is coupled with an input shaft 112. The input shaft 112 may correspond to the LP shaft 36 of the turbine engine 10 of FIG. 1. The ring gear assembly 110 is coupled to an output shaft 114. The output shaft 114 may correspond to fan shaft 45 of the turbine engine 10 of FIG. 1. The fan shaft 45 rotates faster than does the LP shaft 36. In an embodiment, both the sun gear assembly 106 and the ring gear assembly 110 rotate while the planet gear assembly 108 is stationary. The planet gear assembly 108 is coupled to a frame 116 of the turbine engine 10. The ring gear assembly 110 is coupled to the output shaft 114 (e.g., the fan shaft 45) using a plurality of fasteners 120 (e.g., bolts and nuts).

The epicyclic gearbox assembly 100 further includes a lubrication system for providing lubrication fluid to various components of the epicyclic gearbox assembly 100. For example, the lubrication system is configured to provide lubrication fluid to the planet gear assembly 108. In addition, the epicyclic gearbox assembly 100 additionally includes features for containing the lubrication fluid provided to components of the epicyclic gearbox assembly 100 by the lubrication system during operation of the epicyclic gearbox assembly 100.

The lubrication fluid may flow (as is indicated by arrows 130) from a location forward of the ring gear assembly 110. As it should be appreciated during operation of the epicyclic gearbox assembly 100 the lubrication fluid may be centrifuged outwardly along the radial direction R due to, e.g., a relatively high rotational speed of at least certain components within the epicyclic gearbox assembly 100. Accordingly, the lubrication fluid may acquire a relatively high amount of kinetic energy as it begins to be centrifuged radially outwardly during operation of the epicyclic gearbox assembly 100. As a result, the lubricant fluid (e.g., lubricant droplets) present in the vicinity of the plurality of fasteners 120 (e.g., bolts and nuts) may interfere with the rotation of plurality of fasteners 120 and, thus, of the rotation of the output shaft 114. Therefore, it is desirable to reduce the interaction of the lubricant fluid with the rotation of the plurality of fasteners 120. This can be performed by reducing the number of edge surfaces in the plurality of fasteners 120.

Figure 4:
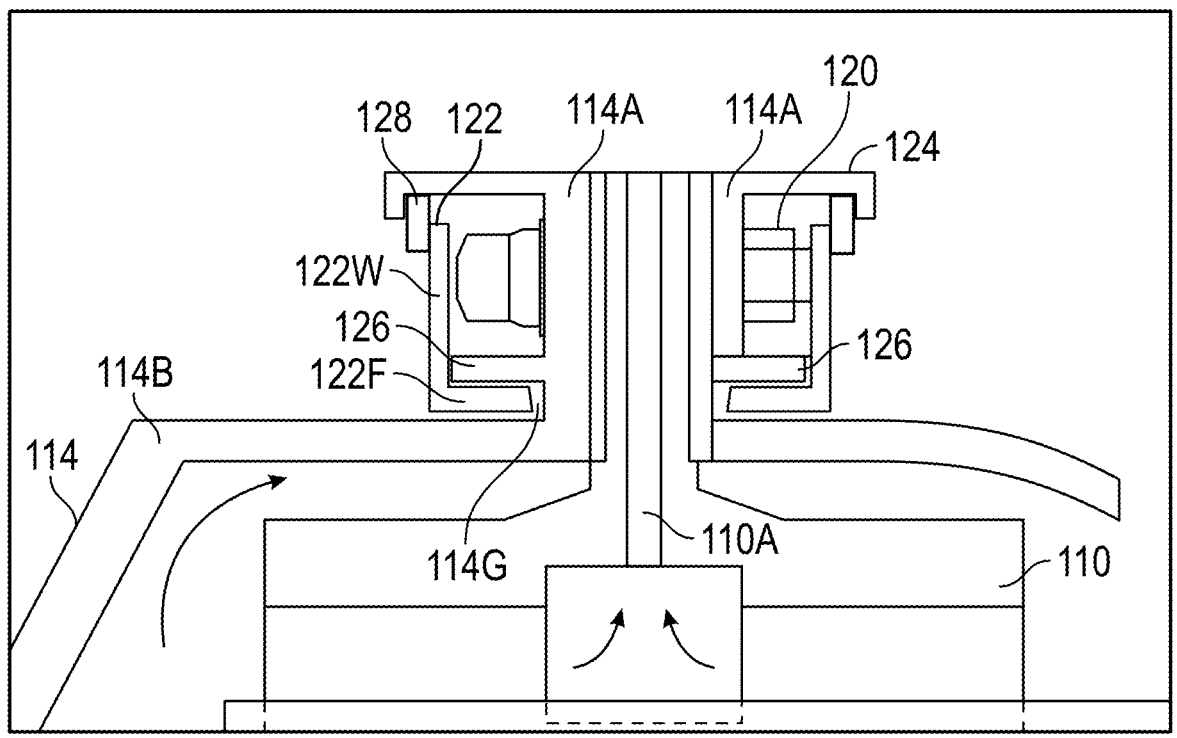
FIG. 4 is an enlarged schematic diagram of the epicyclic gearbox assembly showing a coupling of the ring gear assembly to an output shaft, according to an embodiment of the present disclosure.

FIG. 4 is an enlarged schematic diagram of the epicyclic gearbox assembly 100 showing a coupling of the ring gear assembly 110 to the output shaft 114 including one of the plurality of fasteners 120, according to an embodiment of the present disclosure. As shown in FIG. 4, the plurality of fasteners 120 are covered with a windage cover 122. An end 114A of the output shaft 114 is coupled to a flange 110A of the ring gear assembly 110. The end 114A of the output shaft 114 has an integral cover shell 124 and an integral lip 126. The windage cover 122 is a ring and has an "L" shape cross section. The windage cover 122 has a foot portion 122F and a wall portion 122W connected to the foot portion 122F. The windage cover 122 also includes a clip retention member 128. The foot portion 122F of the "L" shape of the windage cover 122 is inserted in a pilot groove 114G between the integral lip 126 and an arm portion 114B of the output shaft 114. The wall portion 122W of the "L" shape of the windage cover 122 is retained at one end by the clip retention member 128 that abuts the integral cover shell 124 of the output shaft 114. In an embodiment, the windage cover 122 has a ring shape configured to cover the plurality of fasteners 120 distributed circumferentially at a radial position from the longitudinal axis A. The windage cover 122 is held in place during rotation of the ring gear assembly 110 and output shaft 114 by a centrifugal force exerted on the windage cover 122 to push on and to contact the integral lip 126 of the output shaft 114. The integral lip 126 acts as the radial retention mechanism such that increasing rotation speed (centrifugal force) results in increased radial contact stress between rotating parts. The clip retention member 128 maintains the windage cover 122 in place and retains the windage cover 122 longitudinally. The clip retention member 128 restrains a longitudinal movement of windage cover 122. The windage cover 122 is not fastened to the output shaft 114. Specifically, the windage cover 122 is not attached to the output shaft 114 using a fastener (e.g., bolt, screws, or the like). In an embodiment, the windage cover 122 is a boltless shield that is incorporated at the flange 110A of the ring gear assembly 110. The windage cover 122 reduces or even eliminates shear losses associated with the interrupted geometry of the fasteners 120 and flange 110A of the ring gear assembly 110.

Figure 5:
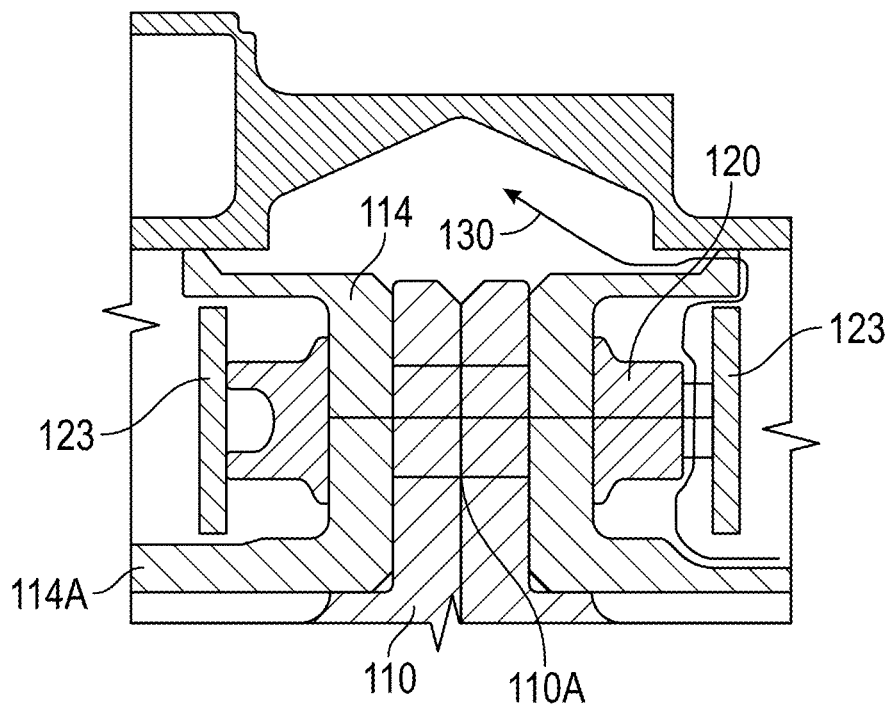
FIG. 5 is an enlarged schematic cross-sectional diagram of the epicyclic gearbox assembly showing a coupling of the ring gear assembly to the output shaft, according to another embodiment of the present disclosure.

FIG. 5 is an enlarged schematic cross-sectional diagram of the epicyclic gearbox assembly 100 showing a coupling of the ring gear assembly 110 to the output shaft 114 including one of the plurality of fasteners 120, according to another embodiment of the present disclosure. Similar to the previous embodiment shown in FIG. 4, the end 114A of the output shaft 114 is coupled to the flange 110A of the ring gear assembly 110. In the embodiment shown in FIG. 5, however, the epicyclic gearbox assembly 100 has a windage cover 123 that covers the plurality of fasteners 120 (e.g., bolts and nuts) that couple the ring gear assembly 110 to the output shaft 114 that is different from the windage cover 122 of FIG. 4.

Figure 6A:
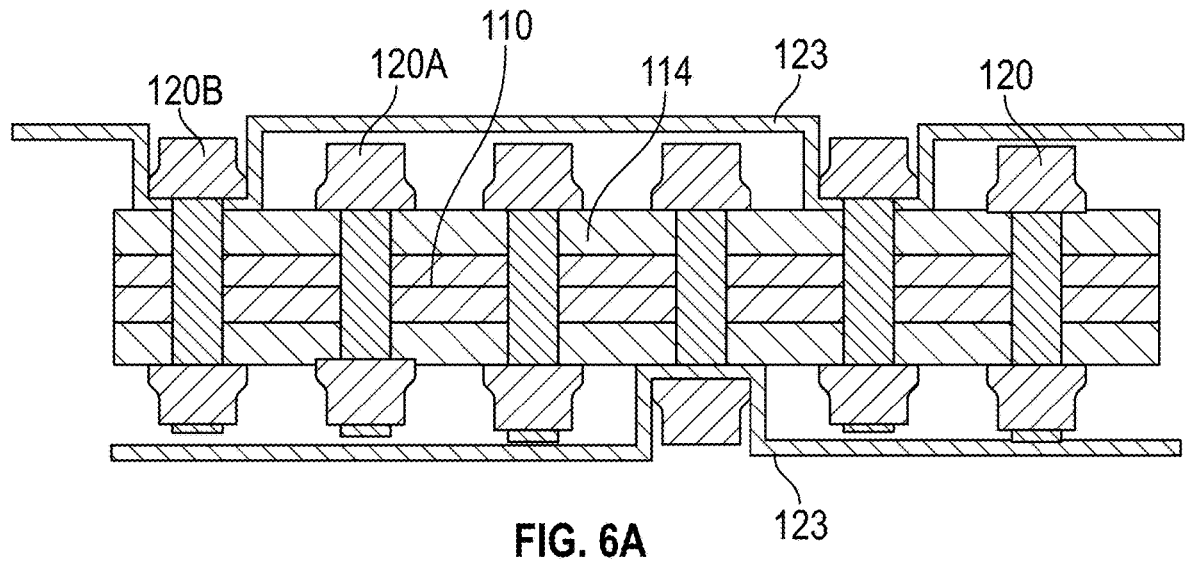
FIGS. 6A and 6B are schematic cross-sectional diagrams of the coupling between the ring gear assembly and the output shaft using a plurality of fasteners, according to an embodiment of the present disclosure.
Figure 6B:
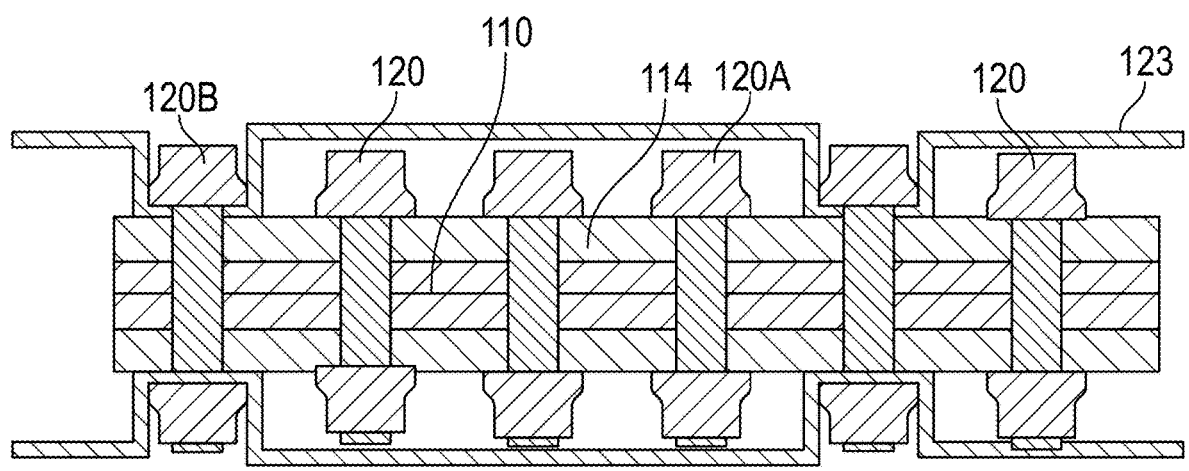

FIGS. 6A and 6B are schematic cross-sectional diagrams of a cross-section of the coupling between the ring gear assembly 110 and the output shaft 114 using the plurality of fasteners 120, according to an embodiment of the present disclosure. As shown in FIGS. 6A and 6B, in the case of the plurality of fasteners 120 with two coupled fasteners, such as in a bolt-nut configuration, two opposite windage covers 123 are used to cover the bolt side and the nut side of plurality of fasteners 120. FIG. 6B shows a configuration in which the two opposite windage covers 123 are held to output shaft 114 by two opposite fasteners (e.g., the nut and the bolt). FIG. 6A shows a configuration in which the two opposite windage covers 123 are held to the output shaft 114 by different fasteners 120.

As shown in FIGS. 6A and 6B, in this embodiment, the windage cover 123 covers a first plurality of fasteners 120A in the plurality of fasteners 120, and the windage cover 123 is held in place using a second plurality of fasteners 120B in the plurality of fasteners 120. In this way, the windage cover 123 covers the first plurality of fasteners 120A in the plurality of fasteners 120, except for the second plurality of fasteners 120B that are used to hold the windage cover 123. Therefore, there remains the second plurality of fasteners 120B in the plurality of fasteners 120 that need to be covered to reduce or to prevent fluid lubricant from interacting with edges of the remaining not covered second plurality of fasteners 120B. To further solve this problem, a second plurality of covers 127 are provided to cover the remaining not covered second plurality of fasteners 120B, as shown in FIGS. 7A to 7C.

Figure 7A:
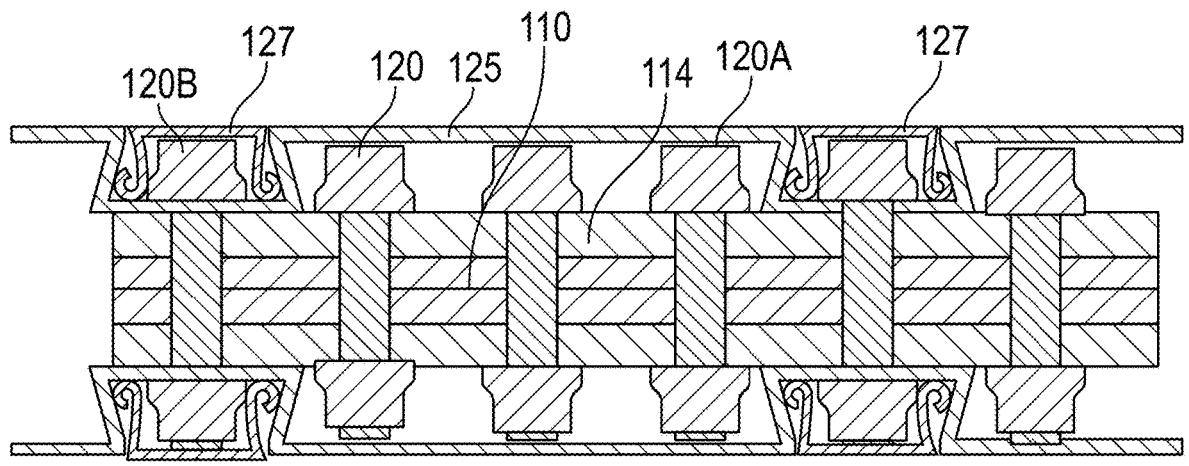
FIGS. 7A to 7C are schematic of cross-sectional views of the coupling between the ring gear assembly and the output shaft using a plurality of fasteners, according to an embodiment of the present disclosure.
Figure 7B:
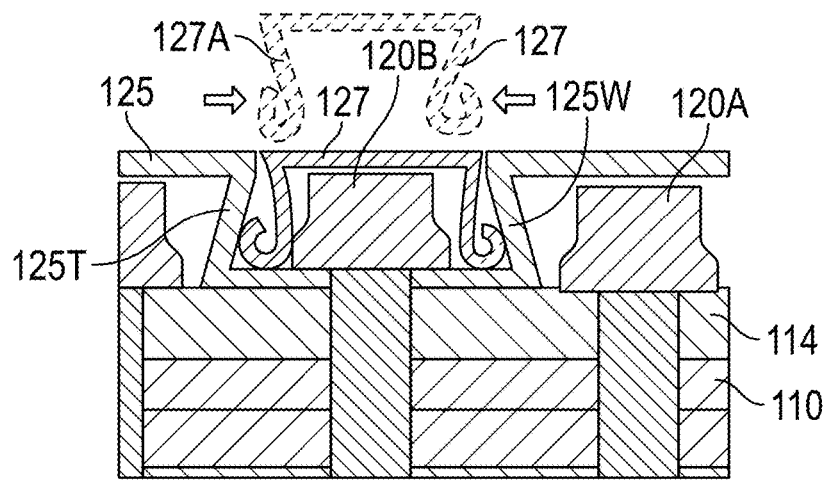
Figure 7C:
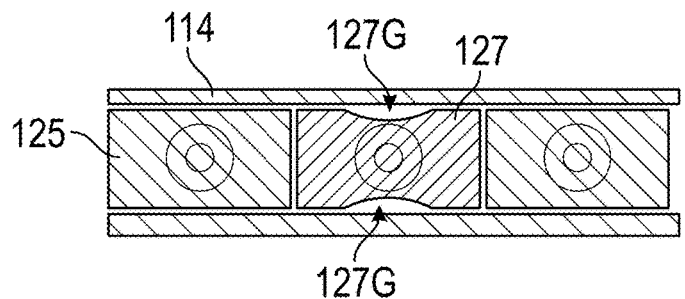

FIGS. 7A to 7C are schematic cross-sectional views of the coupling between the ring gear assembly 110 and the output shaft 114 using a plurality of fasteners 120, according to an embodiment of the present disclosure. The first plurality of fasteners 120A are covered by a first plurality of covers 125 and the second plurality of fasteners 120B are covered by a second plurality of covers 127. The first plurality of covers 125 are held by the second plurality of fasteners 120B that are not covered by the first plurality of covers 125. In order to cover the remaining not covered second plurality of fasteners 120B, the second plurality of covers 127 are used. The second plurality of covers 127 are coupled to the first plurality of covers 125. To couple the second plurality of covers 127 to the first plurality of covers 125, the first plurality of covers 125 are provided with a trapezoid-shape 125T at the attachment points with the second plurality of fasteners 120B of the plurality of fasteners 120. The second plurality of covers 127 is provided with spring-like arms 127A that are pre-loaded and contoured to be inserted into edges of the trapezoid-shape 125T to cover the remaining second plurality of fasteners 120B. The spring-like arms 127A of the second plurality of covers 127 are pressed on opposite sides, as shown by the arrows in FIG. 7B, before inserting the second plurality of covers 127 into the trapezoid-shape 125T of the first plurality of covers 125 to cover the remaining second plurality of fasteners 120B. The spring-like arms 127A of the second plurality of covers 127 abut sidewalls 125W of the trapezoid-shape 125T of the first plurality of covers 125 to hold the second plurality of covers 127 in place to cover the second plurality of fasteners 120B. As must be understood, each of the remaining not covered second plurality of fasteners 120B of the plurality of fasteners 120 is provided with an individual cover of the second plurality of covers 127. FIG. 7C shows a schematic cross-sectional diagram of a front view corresponding to the cross-sectional view shown in FIG. 7B. As shown in FIG. 7C, puller grooves 127G are provided on the second plurality of covers 127 (bolt cap) to act as the spring-like arms 127A to grip on the sidewalls 125W of the first plurality of covers 125 and be held in place and to cover each individual fastener of the second plurality of fasteners 120B not covered by the first plurality of covers 125.

As a result, the embodiments of the present disclosure described above provide a windage cover that is incorporated at the ring gear bolted flange to provide a windage guard/shield to reduce shear losses associated with interrupted bolted flange geometry.

As can be appreciated from the discussion above, there is provided a windage cover for a plurality of fasteners coupling a ring gear assembly to an output shaft. The windage cover includes a clip retention member abutting an integral cover shell of the output shaft, and a foot portion configured to be inserted into a pilot groove between an integral lip and an arm portion of the output shaft. The windage cover also includes a wall portion connected to the foot portion, the wall portion being retained at one end of the wall portion by the clip retention member. The windage cover is configured to cover the plurality of fasteners.

The windage cover according to the above clause, wherein the windage cover is a ring cover having an "L" shaped cross-section.

The windage cover according to any of the above clauses, wherein the integral lip of the output shaft is configured to retain radially the windage cover during rotation of the output shaft.

The windage cover according to any of the above clauses, wherein the clip retention member is configured to restrain a longitudinal movement of windage cover.

The windage cover according to any of the above clauses, wherein the windage cover is not attached to the output shaft using a fastener.

The windage cover according to any of the above clauses, wherein the windage cover is configured to reduce shear losses associated with interrupted geometry or edges of the plurality of fasteners.

As can be further appreciated from the discussion above also provided is a windage cover for a plurality of fasteners coupling a ring gear assembly to an output shaft. The windage cover includes a first plurality of covers configured to cover a first plurality of fasteners in the plurality of fasteners, the first plurality of fasteners being configured to couple the ring gear assembly to the output shaft, the first plurality of covers being configured to be held to the output shaft by a second plurality of fasteners in the plurality of fasteners, the second plurality of fasteners not being covered by the first plurality of covers. The windage cover also includes a second plurality of covers configured to cover the second plurality of fasteners not covered by the first plurality of covers. The second plurality of covers are coupled to the first plurality of covers to form the windage cover to cover the plurality of fasteners.

The windage cover according the above clause, wherein each of the second plurality of covers includes spring-like arms, the spring-like arms being configured to abut against wall of the first plurality of covers.

The windage cover according to any of the above clauses, wherein the first plurality of covers comprises a trapezoid shape at attachment points with the second plurality of fasteners.

The windage cover according to any of the above clauses, wherein each of the second plurality of fasteners is covered by a corresponding one of the second plurality of covers.

The windage cover according to any of the above clauses, wherein the windage cover is configured to reduce shear losses associated with interrupted geometry or edges of the plurality of fasteners.

As can be further appreciated from the discussion above an epicyclic gearbox assembly is provided. The epicyclic gearbox assembly includes a ring gear assembly, a plurality of fasteners configured to couple the ring gear assembly to an output shaft, and a windage cover configured to cover the plurality of fasteners, the windage cover being held in place by the output shaft.

The epicyclic gearbox assembly according to the above clause, wherein the plurality of fasteners is distributed circumferential at a radial position from a longitudinal axis of rotation of the epicyclic gearbox assembly.

The epicyclic gearbox assembly according to any of the above clauses, the epicyclic gearbox assembly further including a planet gear assembly and a sun gear assembly coupled to an input shaft. The planet gear assembly is provided between the sun gear assembly and the ring gear assembly such that the sun gear assembly engages the planet gear assembly which in turn engages the ring gear assembly.

The epicyclic gearbox assembly according to any of the above clauses, wherein the windage cover includes a clip retention member abutting an integral cover shell of the output shaft, a foot portion configured to be inserted into a pilot groove between an integral lip and an arm portion of the output shaft, and a wall portion connected to the foot portion, the wall portion being retained at one end of the wall portion by the clip retention member. The windage cover is configured to cover the plurality of fasteners.

The epicyclic gearbox assembly according to any of the above clauses, wherein the windage cover is a ring cover having an "L" shaped cross section.

The epicyclic gearbox assembly according to any of the above clauses, wherein the integral lip of the output shaft is configured to retain radially the windage cover during rotation of the output shaft.

The epicyclic gearbox assembly according to any of the above clauses, wherein the clip retention member is configured to restrain a longitudinal movement of windage cover.

The epicyclic gearbox assembly according to any of the above clauses, wherein the windage cover includes a first plurality of covers configured to cover a first plurality of fasteners in the plurality of fasteners, the first plurality of fasteners being configured to couple the ring gear assembly to the output shaft, the first plurality of covers being configured to be held to the output shaft by a second plurality of fasteners in the plurality of fasteners, the second plurality of fasteners not being covered by the first plurality of covers, and a second plurality of covers configured to cover the second plurality of fasteners not covered by the first plurality of covers. The second plurality of covers are coupled to the first plurality of covers to form the windage cover to cover the plurality of fasteners.

The epicyclic gearbox assembly according to any of the above clauses, wherein each of the second plurality of covers includes spring-like arms, the spring-like arms being configured to abut against a sidewall of the first plurality of covers.

The epicyclic gearbox assembly according to any of the above clauses, wherein the first plurality of covers includes a trapezoid shape at attachment points with the second plurality of fasteners.

Although the foregoing description is directed to the preferred embodiments of the present disclosure, it is noted that other variations and modifications will be apparent to those skilled in the art, and may be made without departing from the spirit or scope of the disclosure. Moreover, features described in connection with one embodiment of the present disclosure may be used in conjunction with other embodiments, even if not explicitly stated above.

We claim:

1. An epicyclic gearbox assembly comprising:
   a ring gear assembly;
   a plurality of fasteners configured to couple the ring gear assembly to an output shaft in order to hold the output shaft in place, the output shaft comprising an integral cover shell extending from an end of the output shaft and covering at least partially the plurality of fasteners, an arm portion extending from the end of the output shaft, and an integral lip extending from the end of output shaft; and
   a windage cover configured to cover the plurality of fasteners, the windage cover being held in place by the output shaft, the windage cover having a foot portion configured to be inserted into a pilot groove between the integral lip of the output shaft and the arm portion of the output shaft, and a wall portion connected to the foot portion, the wall portion covering at least partially the plurality of fasteners.

2. The epicyclic gearbox assembly according to claim 1, wherein the plurality of fasteners is distributed circumferentially at a radial position from a longitudinal axis of rotation of the epicyclic gearbox assembly.

3. The epicyclic gearbox assembly according to claim 1, wherein the windage cover comprises:
   a clip retention member abutting the integral cover shell of the output shaft.

4. The epicyclic gearbox assembly according to claim 3, wherein the clip retention member is configured to restrain a longitudinal movement of the windage cover.

5. The epicyclic gearbox assembly according to claim 3, wherein the end of the output shaft has the integral cover shell, wherein the wall portion is retained at an end of the wall portion by the clip retention member that abuts the integral cover shell.

6. The epicyclic gearbox assembly according to claim 1, wherein the foot portion and the wall portion of the windage cover form an "L" shaped cross section.

7. The epicyclic gearbox assembly according to claim 1, wherein the windage cover is a ring cover having an "L" shaped cross section.

8. The epicyclic gearbox assembly according to claim 1, wherein the integral lip of the output shaft is configured to retain radially the windage cover during rotation of the output shaft.

9. The epicyclic gearbox assembly according to claim 1, further comprising a sun gear assembly and a planet gear assembly, the sun gear assembly being configured to engage the planet gear assembly, and the planet gear assembly being configured to engage the ring gear assembly, wherein the sun gear assembly is configured to be coupled to an input shaft.

10. The epicyclic gearbox assembly according to claim 1, further comprising a lubrication system configured to provide a lubricant fluid to components of the epicyclic gearbox assembly.

11. The epicyclic gearbox assembly according to claim 10, wherein the windage cover is configured to cover the plurality of fasteners to reduce interaction of the lubricant fluid with a rotation of the plurality of fasteners.

12. An epicyclic gearbox assembly comprising:
a ring gear assembly;
a plurality of fasteners configured to couple the ring gear assembly to an output shaft in order to hold the output shaft in place; and
a windage cover configured to cover the plurality of fasteners, the windage cover being held in place by the output shaft,
wherein the windage cover comprises a first plurality of covers configured to cover a first plurality of fasteners in the plurality of fasteners, the first plurality of fasteners being configured to couple the ring gear assembly to the output shaft, the first plurality of covers being configured to be held to the output shaft by a second plurality of fasteners in the plurality of fasteners, the second plurality of fasteners not being covered by the first plurality of covers.

13. The epicyclic gearbox assembly according to claim 12, wherein the windage cover comprises a second plurality of covers configured to cover the second plurality of fasteners not covered by the first plurality of covers.

14. The epicyclic gearbox assembly according to claim 13, wherein the second plurality of covers are coupled to the first plurality of covers to form the windage cover to cover the plurality of fasteners.

15. The epicyclic gearbox assembly according to claim 13, wherein each of the second plurality of covers includes spring-like arms, the spring-like arms being configured to abut against a sidewall of the first plurality of covers.

16. The epicyclic gearbox assembly according to claim 13, wherein the first plurality of covers comprises a trapezoidal shape at attachment points with the second plurality of fasteners.

17. The epicyclic gearbox assembly according to claim 13, wherein each of the second plurality of fasteners is covered by a corresponding one of the second plurality of covers.

18. The epicyclic gearbox assembly according to claim 13, wherein the windage cover is configured to reduce shear losses associated with an interrupted geometry of the plurality of fasteners or edges of the plurality of fasteners.

19. The epicyclic gearbox assembly according to claim 13, wherein the second plurality of covers comprises puller grooves configured to grip on sidewalls of the first plurality of covers.

20. The epicyclic gearbox assembly according to claim 13, wherein each of the second plurality of covers is configured to cover each of the second plurality of fasteners not covered by the first plurality of covers.

* * * * *